US012194500B2

(12) United States Patent
Inkyo et al.

(10) Patent No.: US 12,194,500 B2
(45) Date of Patent: Jan. 14, 2025

(54) CLASSIFYING ROTOR AND CLASSIFYING APPARATUS

(71) Applicants: Satake Chemical Equipment Mfg., Ltd., Saitama (JP); Mitsugi Inkyo, Hiroshima (JP)

(72) Inventors: Mitsugi Inkyo, Hiroshima (JP); Makoto Sato, Saitama (JP); Masaaki Ogihara, Saitama (JP); Yuta Hosono, Saitama (JP)

(73) Assignees: Satake Chemical Equipment Mfg., Ltd., Saitama (JP); Mitsugi Inkyo, Hiroshima (JP)

(*) Notice: Subject to any disclaimer, the term of this patent is extended or adjusted under 35 U.S.C. 154(b) by 754 days.

(21) Appl. No.: 17/279,458

(22) PCT Filed: Dec. 27, 2018

(86) PCT No.: PCT/JP2018/048123
§ 371 (c)(1),
(2) Date: Mar. 24, 2021

(87) PCT Pub. No.: WO2020/066046
PCT Pub. Date: Apr. 2, 2020

(65) Prior Publication Data
US 2022/0032343 A1 Feb. 3, 2022

(30) Foreign Application Priority Data
Sep. 26, 2018 (JP) ................................ 2018-180581

(51) Int. Cl.
*B03B 5/32* (2006.01)
*B07B 7/083* (2006.01)

(52) U.S. Cl.
CPC ................ *B07B 7/083* (2013.01); *B03B 5/32* (2013.01)

(58) Field of Classification Search
CPC .. B07B 7/083; B07B 7/08; B07B 5/32; B03B 5/28
See application file for complete search history.

(56) References Cited

U.S. PATENT DOCUMENTS 4,799,595 A * 1/1989 Binder .................... B07B 4/025 209/714
6,276,534 B1 * 8/2001 Huang .................... B07B 7/083 209/714
(Continued)

FOREIGN PATENT DOCUMENTS

CN 206981206 U 2/2018
DE 4402324 A1 * 8/1995 ............. B07B 7/083
(Continued)

*Primary Examiner* — Patrick H Mackey
(74) *Attorney, Agent, or Firm* — Boyle Fredrickson S.C.

(57) ABSTRACT

A classifying rotor has a rotatable frame body and classifying blades. The frame body has an opening portion on an outer peripheral portion and an ejection port for ejecting a fluid having flowed into an inside through the opening portion to an outside. The classifying blades are disposed at a desired interval in a circumferential direction on an outer peripheral side part in the frame body. The classifying blades are provided in the frame body so that an angle formed by a direction of the classifying blade and a rotating direction of the frame body becomes a desired inclination angle. The desired inclination angle is an angle at which classification accuracy becomes better when the classifying blades are inclined so that the formed angle becomes gradually smaller from 90 degrees.

5 Claims, 11 Drawing Sheets

(56) References Cited

U.S. PATENT DOCUMENTS

| | | | | |
|---|---|---|---|---|
| 8,813,967 | B2 * | 8/2014 | Plant | B07B 7/02<br>209/139.1 |
| 9,004,285 | B2 * | 4/2015 | Tanaka | G03G 9/0817<br>209/718 |
| 9,981,290 | B2 * | 5/2018 | Goosen | B07B 7/086 |
| 10,137,478 | B2 * | 11/2018 | Hagemeier | B02C 21/00 |
| 10,744,534 | B2 * | 8/2020 | Colson | B02C 23/08 |
| 11,117,167 | B2 * | 9/2021 | Galk | B07B 7/083 |
| 2018/0154395 | A1 | 6/2018 | Colson et al. | |

FOREIGN PATENT DOCUMENTS

| | | | |
|---|---|---|---|
| JP | 5-68904 | A | 3/1993 |
| JP | 7-185465 | A | 7/1995 |
| JP | 9-179345 | A | 7/1997 |
| JP | 10-43692 | A | 2/1998 |
| JP | 2002-346480 | A | 12/2002 |
| JP | 2014-42900 | A | 3/2014 |
| JP | 2018-66544 | A | 4/2015 |
| WO | 2018030429 | A1 | 2/2018 |

* cited by examiner

| SHAPE | Np(-) |
|---|---|
| 1 | 0.133 |
| 2 | 0.140 |
| 3 | 0.092 |
| 4 | 0.080 |

CLASSIFYING ROTOR AND CLASSIFYING APPARATUS

1. FIELD OF THE INVENTION

The present invention relates to a classifying rotor configured to classify fine particles in a gas or a liquid, for example. Moreover, the present invention relates to a dry type or a wet type classifying apparatus having the classifying rotor. The present invention particularly provides a classifying rotor and a classifying apparatus with extremely high classification accuracy. According to the present invention, few coarse particles mix in, and sharp particle size distribution can be realized.

2. BACKGROUND OF THE INVENTION

The classifying apparatuses include a dry type classifying apparatus which classifies fine particles in gas such as air and a wet type classifying apparatus which classifies fine particles in a liquid such as slurry. The both classifying apparatuses classify the fine particles by rotating classifying rotors at a high speed in which classifying blades are separated from each other in a circumferential direction and disposed radially from a rotation center. Alternatively, the both classifying apparatuses classify the fine particles by rotating the classifying rotors at a high speed in which the classifying blades are separated from each other in the circumferential direction and disposed somewhat eccentrically from the rotation center (disposed with some inclination from a radial direction).

A mechanism of the classification is as follows. First, a fluid such as a gas or a liquid flows into a classification chamber formed between each of adjacent classifying blades of the classifying rotor from an outer peripheral portion. While this fluid moves from the outer peripheral portion toward an inner peripheral side, the particles in the fluid are subjected to a centrifugal force F due to a high-speed rotation of the classifying rotor and a drag R due to the fluid flowing toward the inner peripheral direction opposite to an acting direction of this centrifugal force. Then, the coarse particle having a size larger than a classification particle size at which the both are balanced (F=R) is ejected to an outside of the classifying rotor. Moreover, the fine particle having a size smaller than the classification particle size at which the both are balanced flows into the classifying rotor.

FIG. 16 illustrates a schematic configuration diagram of an entire classification system including a dry type classifying apparatus 1. The classifying apparatus 1 includes, for example, a housing 2, a classifying rotor 3 provided in the housing 2, rotating means 4 for rotating the classifying rotor 3, and an outflow chamber 5 which causes the fine particles classified by the classifying rotor 3 and having flowed into the classifying rotor 3 to flow out of the housing 2. The rotating means 4 includes, for example, a motor (not shown) and a rotating shaft 4*a* rotated/driven by the motor.

Then, a raw material from a raw material supply device 6, for example, is supplied together with air from a supply port 2*a* into the housing 2 of the classifying apparatus 1. Then, the raw material is classified into coarse particles and fine particles by the classifying rotor 3 provided in the housing 2 and rotating at a high speed. The coarse particles are ejected from an ejection port 2*b* of the housing 2 in the classifying apparatus 1 and recovered by a container 7. Moreover, the fine particles having flowed into the classifying rotor 3 from the outer peripheral portion of the classifying rotor 3 are ejected from an ejection port 8 formed around the rotating shaft 4*a* of the classifying rotor 3, formed at a center part of the classifying rotor 3, to the outflow chamber 5 communicating with the ejection port 8. Then, the fine particles flowing out of the housing 2 from the outflow chamber 5 are recovered by a fine particle recovery tank (not shown) through a bug filter (not shown) which separates the fine particles from the air, for example.

Moreover, FIG. 17 illustrates a schematic configuration of the entire classification system including a wet type classifying apparatus 9. The classifying apparatus 9 includes, for example, a housing 10, a classifying rotor 11 provided in the housing 10, rotating means 12 for rotating the classifying rotor 11, and a through hole 13 extending in an axial direction and formed in a rotating shaft 12*a* of the rotating means 12 for causing the fine particles classified by the classifying rotor 11 and having flowed into the classifying rotor 11 to flow out of the housing 10. The rotating means 12 includes, for example, a motor (not shown) and the rotating shaft 12*a* rotated/driven by the motor.

Then, a raw material slurry from a raw material slurry tank 14, for example, is supplied by a metering pump 15 from a supply port 10*a* into the housing 10 of the classifying apparatus 9. Then, the raw material slurry is classified into coarse particles and fine particles by the classifying rotor 11 provided in the classifying apparatus 9 and rotating at a high speed. The coarse particles are ejected from an ejection port 10*b* of the housing 10 in the classifying apparatus 9 to an outside of the housing 10. Moreover, the fine particles having flowed into the classifying rotor 11 from an outer peripheral portion of the classifying rotor 11 flow through the through hole 13 of the rotating shaft 12*a* communicating with an ejection port 16 and fixed to the classifying rotor 11 from the ejection port 16 formed at a center part of the classifying rotor 11 and are recovered by a recovery tank 17.

The both classifying rotors 3 and 11 have a rotatable frame body having an opening portion on the outer peripheral portion for leading the fluid such as a gas, a liquid and the like in the housing into the inside and having the ejection port on the center part for ejecting the fine particles having flowed into the classifying rotor to the outside of the classifying rotor and classifying blades disposed radially from a rotation center on the outer peripheral side portion in the frame body at a desired interval in a circumferential direction or disposed somewhat eccentrically from the rotation center (disposed with some inclination from a radial direction).

The classifying rotors 3 and 11 are constituted by, as illustrated in FIG. 18 and FIG. 19, for example, the frame body made of two disc-shaped plates 18*a* and 18*b* having the same shape disposed coaxially and separated vertically and the ejection port 8 (16) provided at the center part of the upper side plate 18*a* and a plurality of classifying blades 19 provided radially from the rotation center at an equal interval in the circumferential direction between outer peripheral side portions of surfaces faced with each other of the two plates 18*a* and 18*b* or provided somewhat eccentrically from the rotation center (provided with some inclination from the radial direction). And a classification chamber 20 is formed between the classifying blades 19 and 19 adjacent to each other.

As the dry type classifying apparatus, Patent Literature 1, Japanese Patent Laid-Open No. 2011-72993, can be cited, for example. As the wet type classifying apparatus, Patent Literature 2, Japanese Patent Laid-Open No. 2002-143707, can be cited, for example.

However, in the conventional classifying apparatuses, the classification particle size at which the centrifugal force and the drag are balanced becomes larger as it goes toward the inner periphery in the classification chamber. Since the fluid on the outer side of the classifying rotor rotating at a high speed is in a turbulence state, even if the coarse particles larger than the designed classification particle size jump into the classification chamber of the classifying rotor, when a difference between the classification particle size and the grain size is small, they mix into the inner peripheral side and reach the center and there is a concern that they are recovered as they are.

Thus, there is provided an improved classifying rotor formed such that a classification particle size at which the centrifugal force F=drag R is gained becomes a constant size (same size) over the entire region in the radial direction from the outer periphery (a circumference between distal ends of the classifying blades adjacent to each other) to the inner periphery (a circumference between base portions of the classifying blades adjacent to each other) of the classification chamber (Patent Literature 3, WO2018/030429).

SUMMARY

Examples of the improved classifying rotors 3 and 11 are illustrated in FIG. 20 and FIG. 21, for example. In the examples of the improved classifying rotors 3 and 11, the classifying blade 19 is formed such that a thickness t in the circumferential direction is constant (same) from the distal end (outer peripheral end) toward the base portion (inner peripheral end) and a height of the classifying rotor in a rotating shaft direction becomes higher from the distal end (outer peripheral end) toward the base portion (inner peripheral end).

A height T (d) of the classifying blade 19 at a diameter d position of the classification chamber 20 is acquired by the following formula 1, for example:

$$T(d)=\frac{Q}{\pi d-tN}\cdot\frac{1}{D_1^2}\cdot\frac{2\times 894}{d\cdot n^2}\cdot\frac{18\eta}{9.8(\rho_2-\rho_1)}\quad\text{[Formula 1]}$$

Here, reference character Q denotes a flowrate of a fluid toward the inner peripheral direction, N denotes the number of the classification chambers in the circumferential direction, $D_1$ denotes a classification particle size, n denotes a rotation number of the rotor, η denotes viscosity of the fluid, $\rho_1$ denotes a specific weight of the fluid, $\rho_2$ denotes a specific weight of the particle, and t denotes a thickness of the blade (constant).

Moreover, other examples of the improved classifying rotors 3 and 11 are illustrated in FIG. 22 and FIG. 23, for example. The other examples of the improved classifying rotors 3 and 11 are formed such that the classifying blades 19 have the height T of the classifying rotors in the rotating shaft direction being constant (same) from the distal end toward the base portion, and the thickness t in the circumferential direction becomes larger from the base portion (inner peripheral end) toward the distal end (outer peripheral end).

And the thickness t (d) of the classifying blade in the circumferential direction at the diameter d position of the classification chamber 20 is acquired by the following formula 2, for example. The thickness in the circumferential direction (hereinafter, referred to simply as a thickness of a blade) and a chord thereof are proximate, and the both are treated substantially as the same.

$$t(d)=\frac{1}{N}\left[\pi d-\frac{Q}{T}\times\frac{1}{D_1^2}\times\frac{2\times 894}{d\cdot n^2}\times\frac{18\eta}{9.8(\rho_2-\rho_1)}\right]\quad\text{[Formula 2]}$$

Here, reference character Q denotes a flowrate of a fluid toward the inner peripheral direction, N denotes the number of the classification chambers in the circumferential direction, $D_1$ denotes a classification particle size, n denotes a rotation number of the rotor, η denotes viscosity of the fluid, $\rho_1$ denotes a specific weight of the fluid, $\rho_2$ denotes a specific weight of the particle, and T denotes a height of the blade (constant).

Note that, as illustrated in FIG. 23, the thickness t(d) of the blade at the inner peripheral end (base portion) of the classifying blade may be set to 0.

Moreover, in still other examples of the classifying rotors 3 and 11, the classifying blade 19 is formed such that the height of the classifying rotor in the rotating shaft direction becomes higher toward the inner periphery, and the thickness in the circumferential direction becomes larger toward the outer periphery, for example.

And the height T(d) of the classifying blade 19 at the diameter d position of this classification chamber 20 and the thickness t(d) of the classifying blade 19 are acquired by the following formula 3, formula 4, and formula 5, for example.

$$T(d)=\frac{Q}{E(d)\cdot N}\cdot\frac{1}{D_1^2}\cdot\frac{2\times 894}{d\cdot n^2}\cdot\frac{18\eta}{9.8(\rho_2-\rho_1)}\quad\text{[Formula 3]}$$

$$E(d)=\frac{\pi}{N}\cdot\left\{b\cdot d_2-\frac{b\cdot d_2-a\cdot d_1}{d_2-d_1}\times(d_2-d)\right\}\quad\text{[Formula 4]}$$

$$t(d)=\frac{\pi d}{N}-\frac{\pi}{N}\cdot\left\{b\cdot d_2-\frac{b\cdot d_2-a\cdot d_1}{d_2-d_1}\times(d_2-d)\right\}\quad\text{[Formula 5]}$$

Here, reference character E(d) denotes an interval between the blades at the diameter d position of the classification chamber, a denotes an interval coefficient between inner peripheral blades $(\pi d_1-Nt_1)/(\pi d_1)$, b denotes an interval coefficient between outer peripheral blades $(\pi d_2-Nt_2)/(\pi d_2)$, $d_1$ denotes an inner peripheral diameter of the classification chamber, $d_2$ denotes an outer peripheral diameter of the classification chamber, $t_1$ denotes an inner peripheral thickness of the blade, $t_2$ denotes an outer peripheral thickness of the blade, Q denotes a flowrate of the fluid toward the inner peripheral direction, N denotes the number of the classification chambers in the circumferential direction, $D_1$ denotes a classification particle size, η denotes viscosity of the fluid, $\rho_1$ denotes a specific weight of the fluid, and $\rho_2$ denotes a specific weight of the particle.

According to the improved classifying rotor, jumping-in of the coarse particles can be prevented, and classification accuracy can be improved.

Moreover, even if the classifying blade of the improved classifying rotor is somewhat inclined with respect to the radial direction of the rotor, too, the jumping-in of the coarse particles can be prevented, and the classification accuracy can be somewhat improved similarly (see Patent Literature 3, FIG. 12).

The present invention has further improved the conventional classifying rotor and the improved classifying rotor. And the present invention prevents separation vortex generated on a back surface of the classifying blade and improves the classification accuracy.

Moreover, the present invention provides the classifying rotor which can prevent waste of energy not contributing to a classifying action caused by generation of this separation vortex. Furthermore, the present invention provides the classifying rotor which can prevent abrasion of the classifying rotor.

In order to achieve the aforementioned object, the classifying rotor of the present invention is constituted by a rotatable frame body having an opening portion on an outer peripheral portion and having an ejection port for ejecting a fluid having flowed into an inside through the opening portion to an outside and a plurality of classifying rotors disposed at a desired interval in a circumferential direction on an outer peripheral side part in the frame body, the classifying blades are provided on the frame body so that an angle formed by a direction of the classifying blade and a rotating direction of the frame body becomes a desired inclination angle, in which the desired inclination angle is an angle at which classification accuracy becomes better when the classifying blades are inclined so that the formed angle becomes gradually smaller from 90 degrees.

Moreover, with regard to the desired inclination angle, the classifying blades are provided on the frame body so that the formed angle is larger than 0 degrees and not larger than (or less than) 45 degrees, larger than 0 degrees and not larger than (or less than) 40 degrees, larger than 0 degrees and not larger than (or less than) 30 degrees or larger than 0 degrees and not larger than (or less than) 20 degrees.

Moreover, a plurality of rectifying blades disposed at a desired interval in the circumferential direction is further provided on an inner side part from the classifying blades in the frame body. Furthermore, a plurality of the rectifying blades disposed radially from a rotation center or disposed eccentrically from the rotation center at a desired interval in the circumferential direction is further provided on the inner side part from the classifying blades in the frame body.

Moreover, the classifying rotor of the present invention is constituted by a rotatable frame body having an opening portion on an outer peripheral portion and having an ejection port for ejecting the fluid having flowed into the inside to an outside through the opening portion, a plurality of classifying blades disposed at a desired interval in the circumferential direction on the outer peripheral side portion in the frame body, and a plurality of rectifying blades disposed at the desired interval in the circumferential direction on the inner side part from the classifying blades in the frame body. Furthermore, the classifying rotor of the present invention is constituted by a rotatable frame body having an opening portion on an outer peripheral portion part and an ejection port for ejecting the fluid having flowed into the inside through the opening portion, a plurality of classifying blades disposed radially from the rotation center or disposed eccentrically from the rotation center at a desired interval in the circumferential direction on the outer peripheral side portion in the frame body, and a plurality of rectifying blades disposed radially from the rotation center at a desired interval in the circumferential direction or disposed eccentrically from the rotation center on the inner side part from the classifying blades.

Moreover, the classifying blade and/or the rectifying blade have an arc shape formed following the Bernoulli curve.

Moreover, the shape of the classifying blade is formed so that the particle size to be classified is constant over the entire region in a radial direction from an outer periphery to an inner periphery in the classification chamber formed between the adjacent classifying blades.

Moreover, a classifying apparatus of the present invention has the classifying rotor.

Advantageous Effect of the Invention

According to the present invention, very few coarse particles mix in, and sharp particle size distribution can be realized. Moreover, power consumption can be reduced.

DETAILED DESCRIPTION

Figure 1:
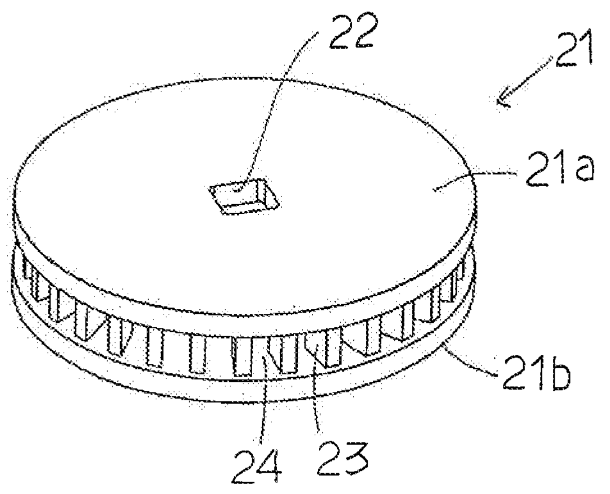
FIG. 1 illustrates a perspective view of a classifying rotor of an embodiment 1 of the present invention.
Figure 2:
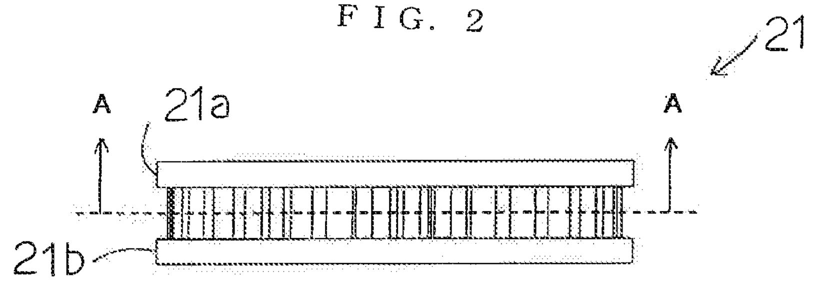
FIG. 2 illustrates a side view of the classifying rotor of the embodiment 1 of the present invention.

Examples of embodiments for embodying the present invention will be described below.

Embodiment 1

The embodiment 1 of the present invention will be described by reference to FIGS. 1 to 10.

In the present invention, a classifying rotor 21 is used instead of the conventional classifying rotors 3 and 11.

The classifying rotor 21 is constituted by a rotatable frame body having an opening portion for leading a fluid such as a liquid like a slurry and a gas in the housings 2 and 10 into an inside on an outer peripheral portion and an ejection port for ejecting fine particles having been led into the rotor to an outside of the rotor at a center part and a plurality of classifying blades disposed at a desired interval in a circumferential direction on an outer peripheral side portion in the frame body, and the classifying blades are provided with inclination so that an angle α formed by each of the classifying blades and a rotating direction of the classifying rotor 21 becomes a desired inclination angle.

The classifying rotor 21 is constituted by a frame body made of two circular plates 21*a* and 21*b* having the same shape and disposed vertically separately and coaxially and an ejection port 22 provided at the center part of the upper disc plate 21*a* and a plurality of classifying blades 23 connected and provided at an equal interval between outer peripheral side portions of surfaces facing each other of the two plates 21*a* and 21*b*.

Reference numeral 24 denotes a classification chamber formed between each of the adjacent classifying blades 23 and 23.

Note that each of the classifying blades 23 is formed having the same shape, respectively, for example. Moreover, each of the classifying blades 23 is constituted by a flat plate having a shape from a base portion (inner peripheral end) toward a distal end (outer peripheral end) of a blade surface on a front surface side (surface facing the rotating direction) being linear, for example. Moreover, each of the classifying blades 23 is provided by being disposed at an equal interval in the circumferential direction separated by an equal distance from the rotation center of the classifying rotor 21, for example. Furthermore, each of the classifying blades 23 is provided so that the formed angle α becomes the same angle, for example.

Figure 3:
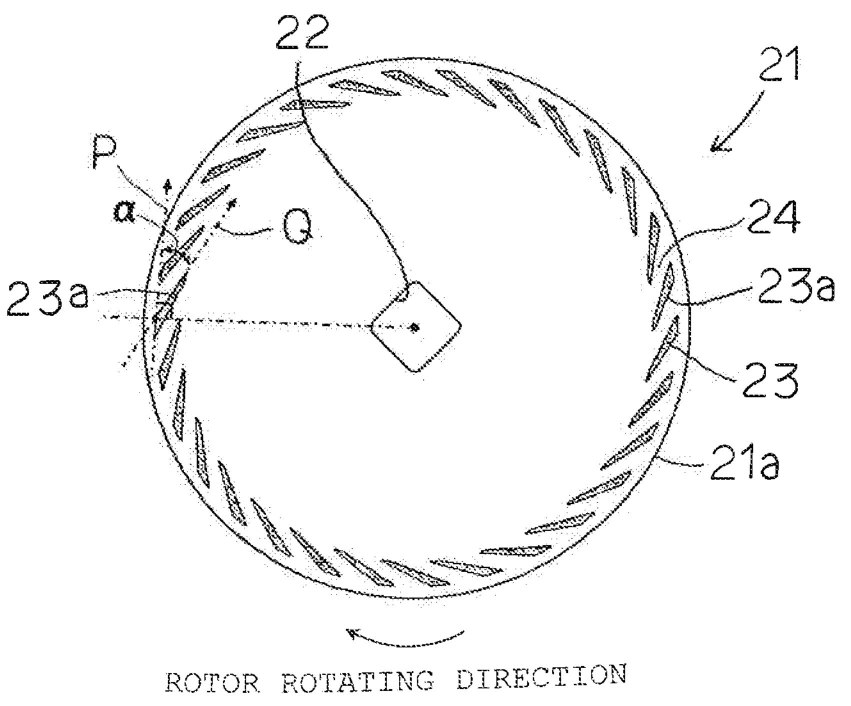
FIG. 3 illustrates an A-A line cross sectional view of FIG. 2.
Figure 4:
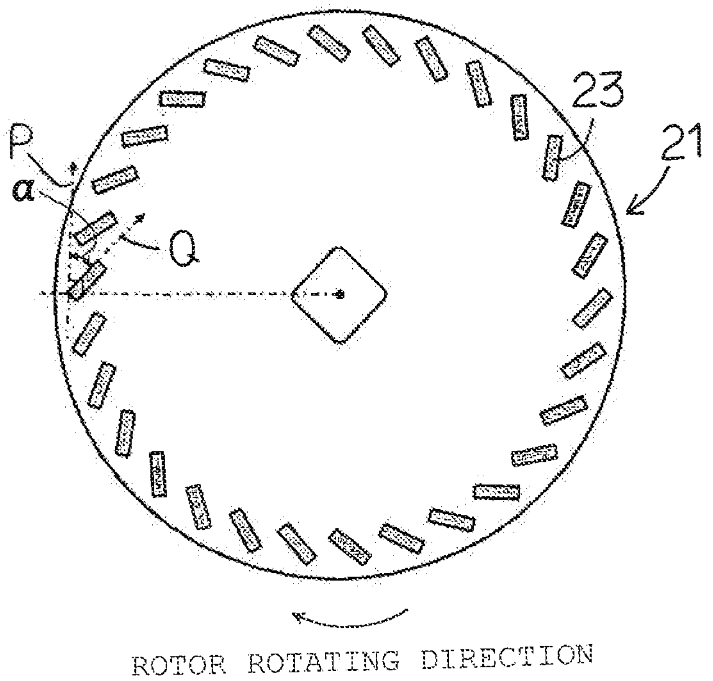
FIG. 4 illustrates a cross sectional view of the classifying rotor of another embodiment of the embodiment 1 of the present invention.

FIG. 3 illustrates an example of the classifying blade formed so that a classification particle size at which a centrifugal force F=drag R is gained becomes constant (same) on the entire region in the classification chamber in the radial direction. The example of the classifying blade illustrates a case of the classifying blade formed so that a height T of each of the classifying blades in the rotating shaft direction of the classifying rotor is constant (same) and a thickness in the circumferential direction becomes larger from the base portion (inner peripheral end) toward the distal end (outer peripheral end). Note that the classifying blades may be such that the classification particle size is not constant (same) in the classification chamber or the thickness is constant (same), for example, as in FIG. 4.

Moreover, each of the classifying blades 23 may have a shape from the base portion toward the distal end being an arc shape other than the flat plate having the shape from the base portion (inner peripheral end) toward the distal end (outer peripheral end) of the front surface being linear. Furthermore, the arc may be an arc made of the Bernoulli curve, for example.

Moreover, the angle α formed by the classifying blade 23 and the rotating direction of the classifying rotor 21 refers to an angle formed by a direction (direction of the blade surface on the front surface side) from the distal end toward the base portion of the blade surface 23*a* on the front surface side of the classifying blade 23 and the rotating direction at the distal end of the blade surface on the front surface side of the classifying blade 23. In other words, the angle α formed by the classifying blade 23 and the rotating direction of the classifying rotor 21 refers to an angle formed by a line drawn between the distal end (outer peripheral end) and the base portion (inner peripheral end) of the blade surface 23*a* on the front surface side of the classifying blade 23 and a line crossing at a right angle the line from a rotation center point of the classifying rotor 21 to the distal end (outer peripheral end) on the front surface side of the classifying blade 23. More specifically, as illustrated in FIG. 3, it refers to the angle α formed by a direction Q from the distal end toward the base portion of the blade surface on the front surface side of the classifying blade and the rotating direction P at the distal end of the blade surface on the front surface side of the classifying blade.

Then, as the result of various experiments and the like, when the classifying blade is inclined so that the formed angle α gradually becomes smaller from 90 degrees, first, the classification accuracy becomes worse (mixing of the coarse particles increases), but when it is further inclined, such an angle is found at which the classification accuracy becomes better, and the angle is referred to as the desired inclination angle. And as the result of various experiments and the like, when the classifying blade is inclined so that the formed angle α becomes gradually smaller from 90 degrees, first, the classification accuracy becomes worse (mixing of the coarse particles increases), but when it is further inclined particularly to 50 degrees or smaller or to 45 degrees or smaller, such an angle is found at which the classification accuracy becomes greatly better than the classification accuracy prior to that, and the angle is referred to as the desired inclination angle.

The angle at which the classification accuracy becomes better refers to an angle at which, when the formed angle α is inclined so as to be gradually smaller from 90 degrees, the classification accuracy which has been worse starts to become better, for example. Alternatively, the angle at which the classification accuracy becomes better refers to an angle at which, when the angle is further inclined from the angle at which the classification accuracy starts to become better, the classification accuracy becomes better than the classification accuracy at the desired angle between the formed angle 90 degrees and the angle at which the classification accuracy starts to become better, for example. Alternatively, the angle at which the classification accuracy becomes better refers to an angle at which, when the angle is further inclined from the angle at which the classification accuracy starts to become better, the classification accuracy becomes better than the best classification accuracy at the angle between the formed angle 90 degrees and the angle at which the classification accuracy starts to become better, for example.

If there are a plurality of angles at which the classification accuracy starts to become better from the angle at which the classification accuracy becomes worse, any one of the angles is recognized as the angle at which the classification accuracy starts to become better.

Moreover, the angle may be determined by considering a shape coefficient which will be described later, for example.

And the desired inclination angle is a value set by various experiments, and the formed angle α is larger than 0 degrees and not larger than (or less than) 45 degrees, larger than 0 degrees and not larger than (or less than) 40 degrees, larger than 0 degrees and not larger than (or less than) 30 degrees or larger than 0 degrees and not larger than (or less than) 20 degrees, for example.

Subsequently, the action and effect of the classifying rotor 21 of the present invention will be described.

The wet type classifying apparatus will be described below, but the same applies to the dry type classifying apparatus.

In the wet type classifying apparatus 9, for example, a raw material slurry from the raw material slurry tank 14 is supplied by the metering pump 15 into the housing 10 of the classifying apparatus 9 through the supply port 10*a*. Then, the raw material slurry is classified into coarse particles and fine particles by the classifying rotor 21 provided in the classifying apparatus 9 and rotating at a high speed. Then, the coarse particles are ejected to outside the housing 10 through the ejection port 10*b* of the housing 10 of the classifying apparatus 9. Moreover, the fine particles having flowed into the classification chamber 24 of the classifying rotor 21 from the outer peripheral portion of the classifying rotor 21 flow through a through hole 31 communicating with the ejection port 22 and formed in the rotating shaft 12*a* fixed to the classifying rotor 21 from the ejection port 22 formed at the center part of the classifying rotor 21 and are recovered by the recovery tank 17.

As the raw material slurry, a dissolved silica dispersion liquid (tap water) by Denka was used. The peripheral speed of the classifying rotor was set to 20 m/s.

An experiment was conducted for the classification accuracy when the classifying blade 23 was inclined with the formed angle α gradually reduced from 90 degrees. As a result, when the formed angle α was inclined from 90 degrees to approximately 45 degrees, the shape coefficient and the classification accuracy became worse, but in the case of an angle not larger than the desired inclination angle, that is, steep inclination at 40 degrees or smaller, for example, a vortex in the classification chamber was reduced, and the classification accuracy was improved by preventing mixing of coarse particles. Moreover, it was found that power consumption was also reduced.

Then, the classifying blade is provided at the desired inclination angle so that the formed angle α is larger than 0 degrees and not larger than (or less than) 45 degrees, for example. Alternatively, the classifying blade is provided at the desired inclination angle so that the formed angle α is larger than 0 degrees and not larger than (or less than) 40 degrees. Alternatively, the classifying blade is provided at the desired inclination angle so that the formed angle α is larger than 0 degrees and not larger than (or less than) 30 degrees. the classifying blade is provided at the desired inclination angle so that the formed angle α is larger than 0 degrees and not larger than (or less than) 20 degrees. The desired inclination angle is preferably set as above since the classification accuracy can be improved, and the shape coefficient can be made smaller so as to reduce power.

Figure 5:
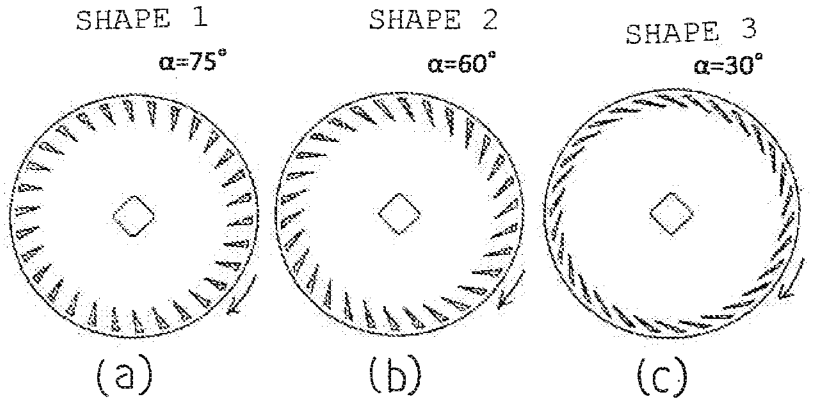
FIGS. 5A-5C illustrate sectional views of the classifying rotors (shape 1, shape 2, shape 3) with angles formed by classifying blades different from each other.
Figure 6:
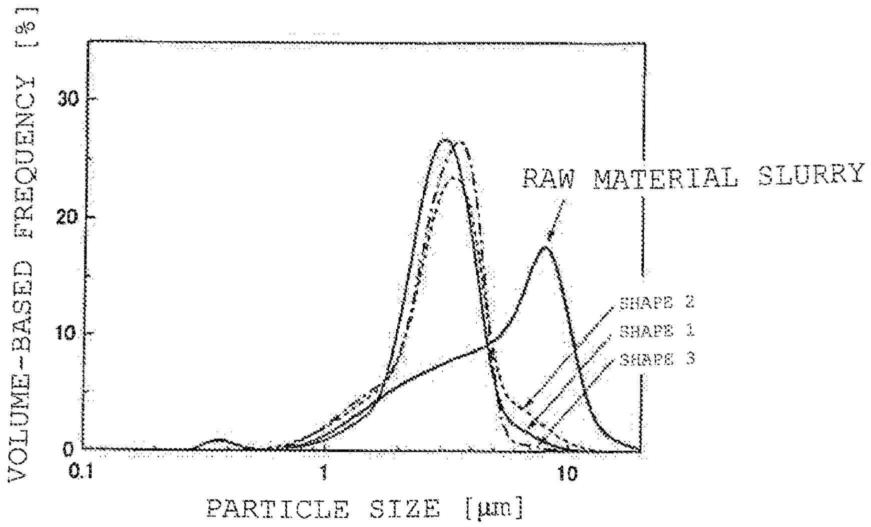
FIG. 6 is a diagram comparing particle size distribution of each of the classifying rotors in FIG. 4.

FIGS. 5(*a*), 5(*b*), and 5(*c*) illustrate the sectional view of the classifying rotor (shape 1) with the formed angle α of the classifying blade is 75 degrees, the sectional view of the classifying rotor (shape 2) with the formed angle α of the classifying blade is 60 degrees, and the sectional view of the classifying rotor (shape 3) with the formed angle α of the classifying blade is 30 degrees. Moreover, FIG. 6 is a diagram comparing the particle size distribution of fine particles in the case when the raw material slurry was classified by each of the classifying rotors with the shapes 1, 2, and 3, respectively. Moreover, in FIG. 6, the lateral axis indicates the particle size (μm), and the vertical axis indicates a volume-based frequency (%).

As illustrated in FIG. 6, mixing of coarse particles is increased in the particle size distribution of the case of the formed angle α at 60 degrees (shape 2) which is more inclined than the case of the conventional rotor with the formed angle α at 75 degrees (shape 1). Therefore, it is found that the classification accuracy becomes worse when the formed angle α is changed to 60 degrees.

However, the mixing of the coarse particles is decreased in the particle size distribution of the case of the formed angle α further inclined to 30 degrees (shape 3) as compared with the classification distribution of the case with the formed angle α at 75 degrees (shape 1) or 60 degrees (shape 2). Therefore, it is found that the classification accuracy is improved by steeply inclining the classifying blade.

Figure 7:
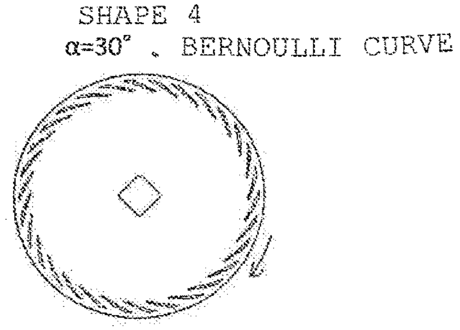
FIG. 7 illustrates a sectional view of the classifying rotor (shape 4) of the classifying blade based on the Bernoulli curve.
Figure 8:
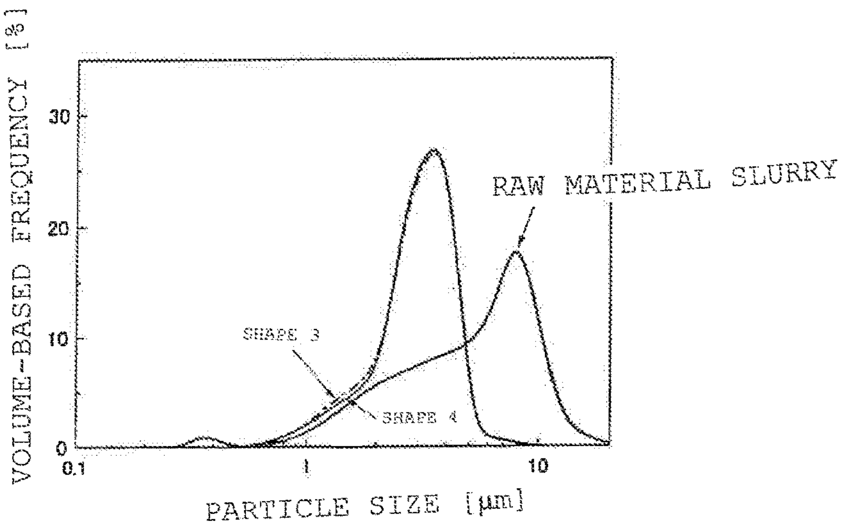
FIG. 8 is a diagram comparing the particle size distribution of the classifying rotors with the shape 3 and the shape 4.

Moreover, FIG. 7 illustrates a sectional view of the case of the classifying rotor (shape 4) with the formed angle α of the classifying blade at 30 degrees, and the shape from the base portion to the distal end of the classifying blade is made of the Bernoulli curve. FIG. 8 is a diagram comparing the particle size distribution of the fine particles when the raw material slurry is classified by the classifying rotors with the shapes 3 and 4, respectively. Moreover, in FIG. 8, the lateral axis indicates the particle size (μm), and the vertical axis indicates the volume-based frequency (%).

As illustrated in FIG. 8, even when the shape from the base portion to the distal end of the classifying blade is made the Bernoulli curve, the high classification accuracy similar to that of the linear classifying blade can be maintained. Moreover, as will be described later, when the shape from the base portion to the distal end of the classifying blade is made the Bernoulli curve, the power number Np can be reduced and thus, unnecessary power consumption and wear of the classifying rotor can be reduced.

Figures 9, 10:
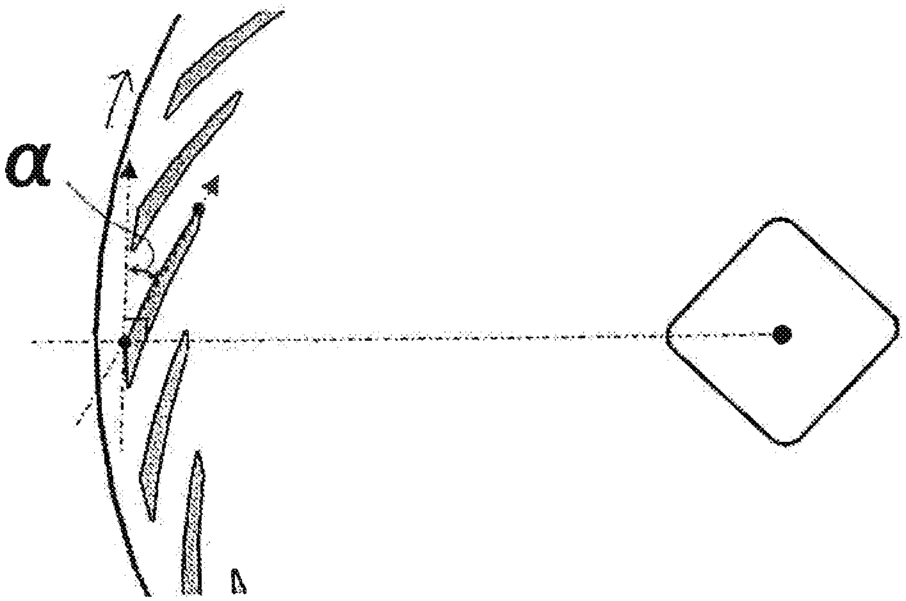
FIG. 9 is a longitudinal sectional view for explaining a formed angle.
FIG. 10 is a table illustrating shape coefficients Np of each of the classifying rotors with the shapes 1, 2, 3, and 4.

If the shape from the base portion to the distal end of the classifying blade is an arc shape such as the Bernoulli curve with the expanding/projecting front surface side of the blade surface, for example, the formed angle α refers to an angle formed by the direction from the distal end (outer peripheral end) toward the base portion (inner peripheral end) of the blade surface 23*a* on the front surface side of the classifying blade 23 and the rotating direction at the distal end (outer peripheral end) of the blade surface on the front surface side of the classifying blade 23 as illustrated in FIG. 9. In other words, the formed angle α refers to an angle formed by a line drawn line between the distal end (outer peripheral end) and the base portion (inner peripheral end) of the blade surface 23*a* on the front surface side of the classifying blade 23 and the line crossing at a right angle the line from the center point of the classifying rotor 21 to the distal end (outer peripheral end) on the front surface side of the classifying blade 23.

Moreover, FIG. 10 is a table indicating the shape coefficient Np of each of the classifying rotors with the shapes 1, 2, 3, and 4.

Furthermore, the power consumption P required for the rotation of the classifying rotor can be expressed by the formula 6:

$$P = Np \cdot \rho \cdot N^3 \cdot d^5 \qquad \text{[Formula 6]}$$

Reference character P denotes the power consumption, p denotes a fluid density, N denotes the rotation number of the rotary body, d denotes the diameter of the rotary body, and Np denotes the shape coefficient of the rotary body and the casing.

From the formula 6, the size of the power consumption P of the classifying rotor can be expressed by the shape coefficient Np. And from FIG. 10, the shape coefficient Np of the classifying rotor (shape 2) with the formed angle α at 60 degrees is larger than that of the classifying rotor (shape 1) with the formed angle α at 75 degrees. However, the shape coefficient Np of the classifying rotor (shape 3) with the formed angle α at 30 degrees is smaller than that of the classifying rotor (shape 2) with the formed angle α at 60 degrees. Therefore, it was found that Np of the rotating rotor of the present invention becomes smaller by making the inclination angle smaller than the desired inclination angle, whereby the power consumption P can be suppressed.

Moreover, the power number Np can be reduced more than the linear classifying blade by forming the shape from the base portion to the distal end of the classifying blade with the Bernoulli curve. Therefore, unnecessary power consumption and wear of the classifying rotor can be reduced by forming the shape from the base portion to the distal end of the classifying blade with the Bernoulli curve.

According to the present invention, very few coarse particles are mixed, and sharp particle size distribution can be realized by setting the aforementioned angle to the angle α formed by the classifying blade.

Embodiment 2

Figure 11:
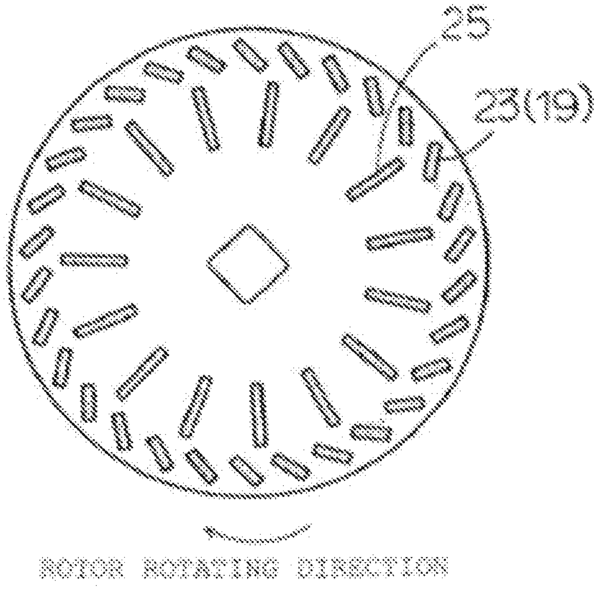
FIG. 11 is a sectional view of a classifying rotor of an embodiment 2 of the present invention.

In the embodiment 2 of the present invention, as illustrated in FIG. 11, in the classifying rotor 21 in the embodiment 1, the conventional classifying rotors 3 and 11 or the improved classified rotors and the like, a plurality of rectifying blades 25 disposed radially from the rotation center in the circumferential direction or disposed eccentrically from the rotation center (disposed with inclination from the radial direction) at a desired interval in the circumferential direction is provided on the inner side part from the classifying blades 23 and 19 in the frame body.

Each of the rectifying blades 25 is formed having the same shape, respectively. Moreover, each of the rectifying blades 25 is formed by a flat plate having a linear shape from the base portion (inner peripheral end) to the distal end (outer peripheral end) of the blade surface on the front surface side, for example. Moreover, each of the rectifying blades 25 is provided by being separated by an equal distance from the rotation centers of the classifying rotors 21, 3, and 11 and disposed at an equal interval in the peripheral direction, for example. Moreover, each of the rectifying blades 25 is provided so that the inclination angle to the radial direction is the same, for example.

The numbers of the classifying blades and the rectifying blades 25 are not particularly limited. The number of the rectifying blades 25 is preferably smaller than the number of the classifying blades. However, if it is too small, the rectification effect is lost and thus, and the number of the rectifying blades 25 is an integral number of ¼ times or more of the number of the classifying blades, an integral number of ⅓ times or more of the number of the classifying blades or an integral number of ½ times or more of the number of the classifying blades, for example.

Moreover, the classifying blades and the rectifying blades 25 are provided by being separated by the desired distance.

In the embodiment 2 illustrated in FIG. 11, the rectifying blade 25 is an example in which an angle β formed by the rectifying blade 25 and the rotating direction of the classifying rotor is 90 degrees. The formed angle β may be provided with inclination so that it is larger than the aforementioned 45 degrees and not larger than 135 degrees as illustrated in FIG. 12.

The angle β formed by the rectifying blade 25 and the rotating direction of the classifying rotor refers to an angle formed by the direction (direction of the blade surface on the front surface side) from the distal end (outer peripheral end) to the base portion (inner peripheral end) of the blade surface on the front surface side of the rectifying blade 25 and the rotating direction at the distal end (outer peripheral end) of the blade surface on the front surface side of the rectifying blade 25. In other words, the angle β formed by the rectifying blade 25 and the rotating direction of the classifying rotor refers to an angle formed by a line drawn between the distal end (outer peripheral end) and the base portion (inner peripheral end) of the blade surface on the front surface side of the rectifying blade 25 and a line crossing at a right angle the line from the rotation center point of the classifying rotor 21 to the distal end (outer peripheral end) on the front surface side of the rectifying blade 25. More specifically, as illustrated in FIG. 12, it refers to the angle β formed by a direction S from the distal end toward the base portion of the blade surface on the front surface side of the rectifying blade and a rotating direction R at the distal end of the blade surface on the front surface side of the rectifying blade.

Figure 12:
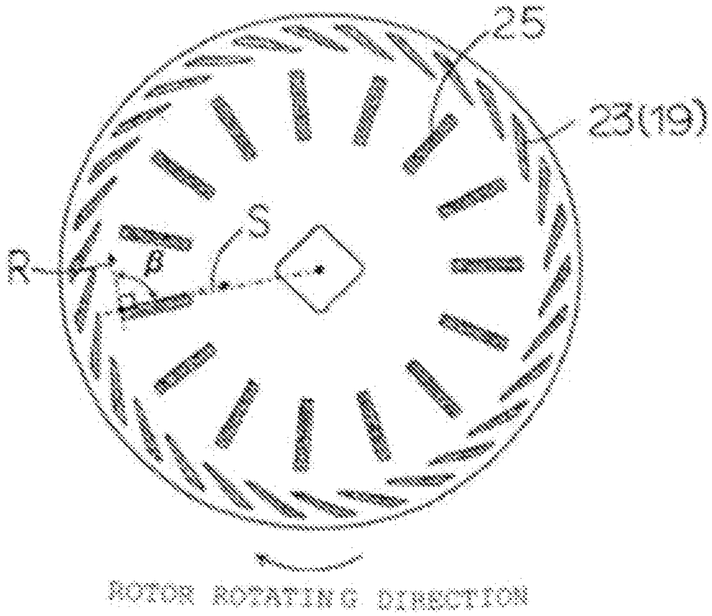
FIG. 12 illustrates a cross sectional view of the classifying rotor of another embodiment of the embodiment 2 of the present invention.

The example of the classifying rotor in FIG. 12 illustrates an example of the classifying blade formed so that the classification particle size at which the centrifugal force F=drag R becomes constant over the entire region in the radial direction in the classification chamber. The example of the classifying blade is an example of the classifying blade formed so that the height T of the classifying rotor in the rotating shaft direction is constant, and the thickness in the circumferential direction becomes larger from the base portion (inner peripheral end) toward the distal end (outer peripheral end).

Moreover, each of the rectifying blades 25 may have an arc shape for the shape from the base portion to the distal end other than the linear flat plate. Moreover, it may be an arc made of the Bernoulli curve.

Subsequently, the action and effect of the classifying rotor having the rectifying blade 25 of the present invention will be described.

According to this embodiment, by providing the rectifying blade 25, the flow of the fluid on the inner side from the classifying blade in the rotor can be made constant in the peripheral direction.

Figure 13:
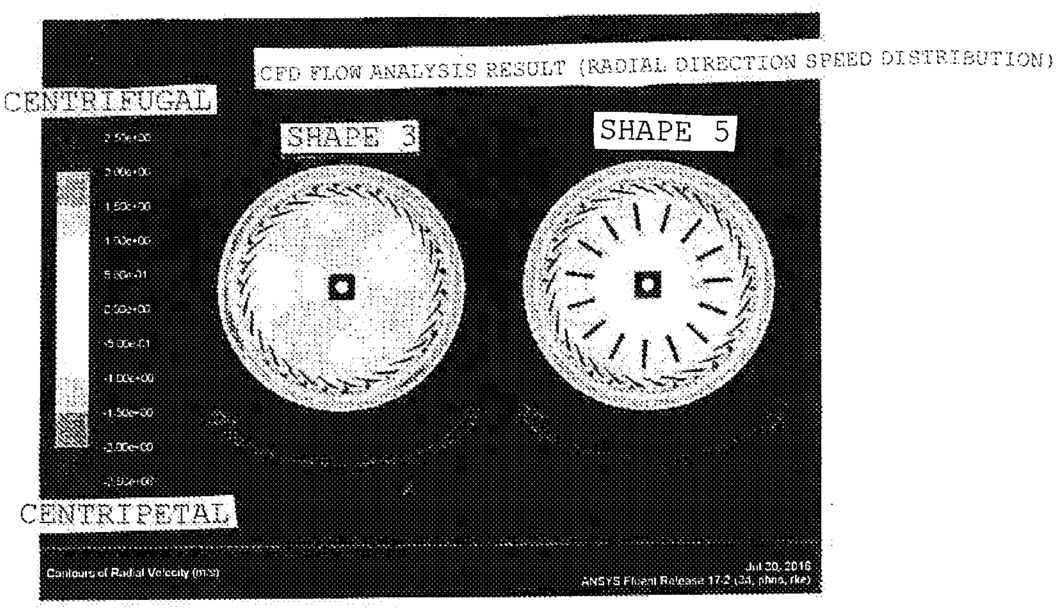
FIG. 13 illustrates a diagram of CFD analysis of a flow in the rotor of the classifying rotor (shape 3) when there is no rectifying blade and of the classifying rotor (shape 5) when there is a rectifying blade (the formed angle $\beta$=90 degrees).

FIG. 13 illustrates a diagram of CFD (computational fluid dynamics) analysis of the flow in the rotor of the classifying rotor (shape 3) without the rectifying blade and the classifying rotor (shape 5) with the classifying blade (formed angle β=90 degrees) when the angle α formed by the classifying blade is 30 degrees. In the shape 3 without the rectifying blade, the direction of the flow of the fluid on the inner side from the classifying blade in the rotor is not constant at a place in the circumferential direction. However, in the shape 5 with the rectifying blade, the direction of the flow of the fluid is constant at a place in the circumferential direction, and it is found that disturbance has been solved.

Figure 14:
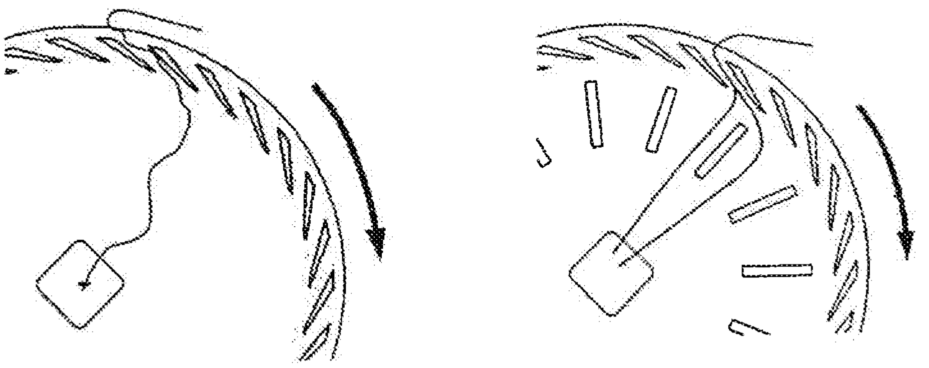
FIG. 14 is a diagram illustrating schematic views of the flows in the classifying rotors in the case of the shape 3 and the shape 5.

Moreover, FIG. 14 is a diagram illustrating schematic views of the flows in the classifying rotors of the cases with the shape 3 and the shape 5. In the shape 3 without the rectifying blade 25, disturbance is found in the classification chamber with the classifying action formed between the adjacent classifying blades. However, in the shape 5 with the rectifying blade, the disturbance in the flow of the fluid going toward the inner peripheral direction from the classification chamber is prevented and rectified and thus, it is known that the disturbance in the classification chamber 24 is prevented.

Figure 15:
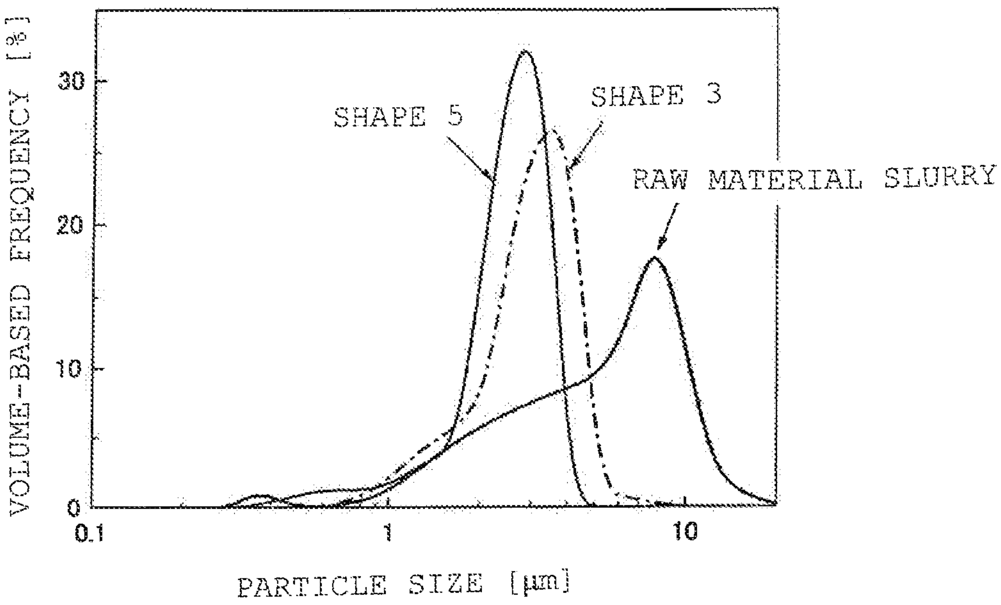
FIG. 15 is a diagram comparing the particle size distribution of the classifying rotors with the shape 3 and the shape 5.
Figure 16:
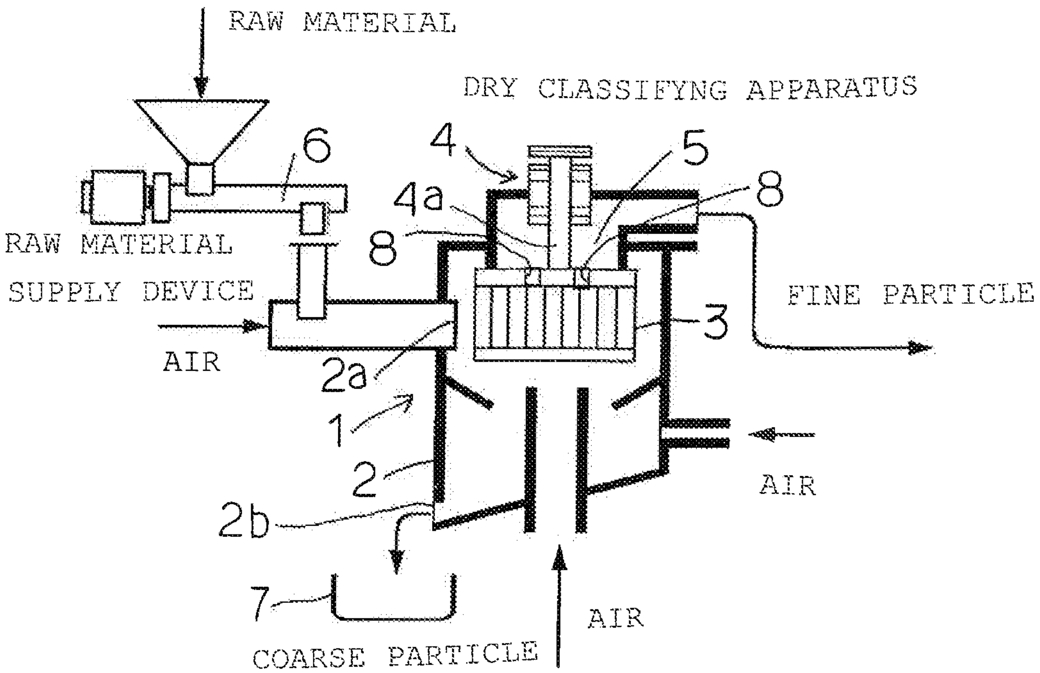
FIG. 16 PRIOR ART
FIG. 16 is a schematic diagram of the entire classification system having a conventional dry type classifying apparatus.
Figure 17:
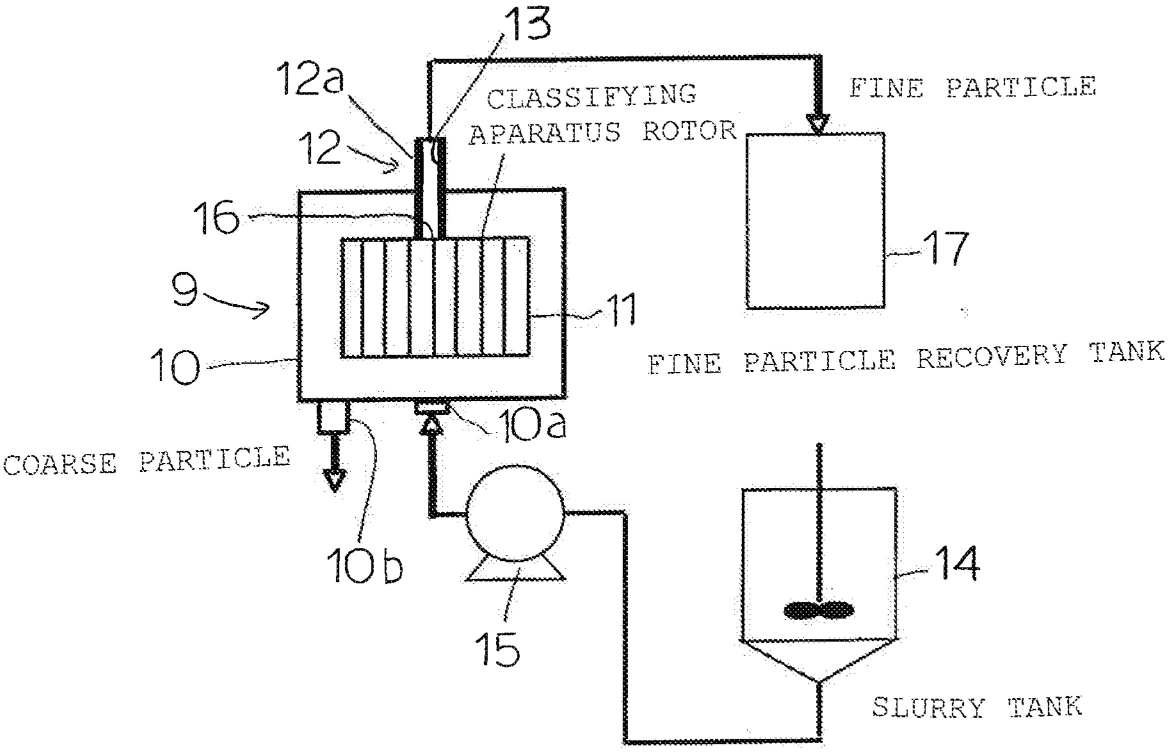
FIG. 17 PRIOR ART
FIG. 17 is a schematic diagram of the entire classification system having a conventional wet type classifying apparatus.
Figure 18:
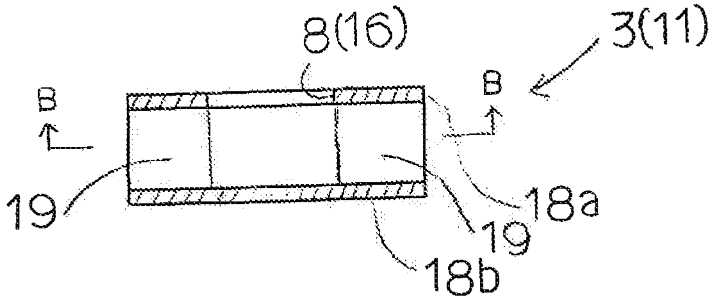
FIG. 18 PRIOR ART
FIG. 18 is a longitudinal section side view of the conventional classifying rotor.
Figure 19:
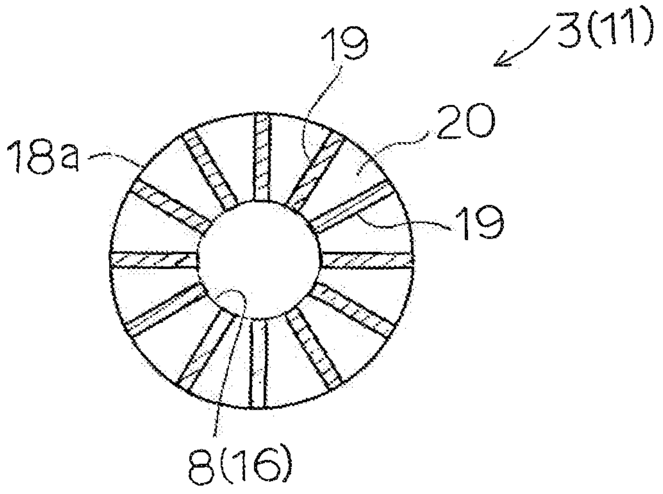
FIG. 19 PRIOR ART
FIG. 19 is a B-B line cross sectional view of FIG. 18.
Figure 20:
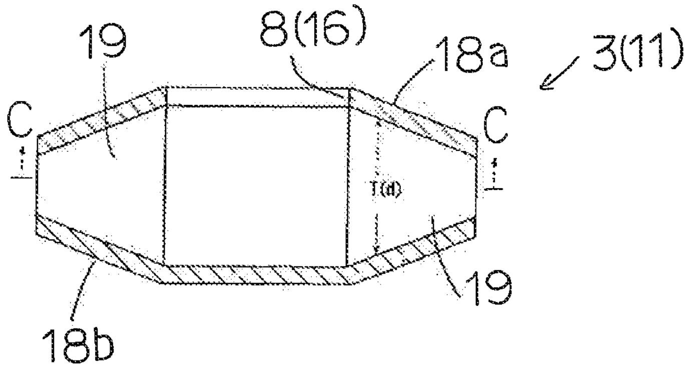
FIG. 20 PRIOR ART
FIG. 20 is a longitudinal section side view of the conventional improved classifying rotor.
Figure 21:
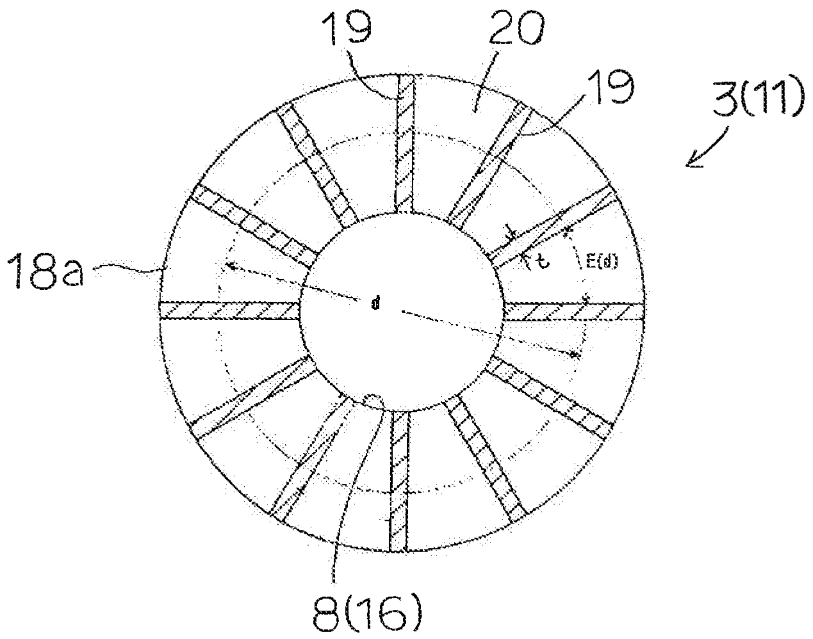
FIG. 21 PRIOR ART
FIG. 21 is a C-C line cross sectional view of FIG. 20.
Figure 22:
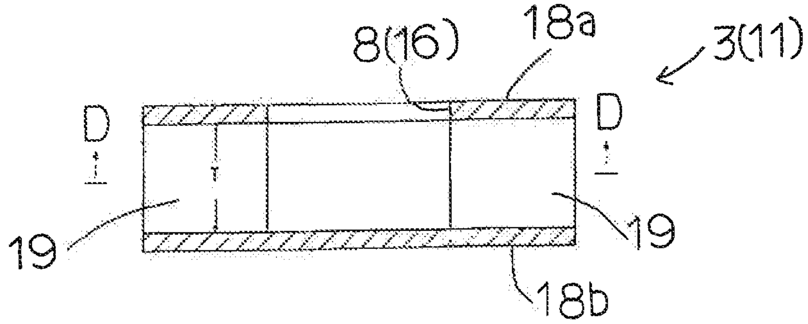
FIG. 22 PRIOR ART
FIG. 22 is a longitudinal section side view of another conventional improved classifying rotor.
Figure 23:
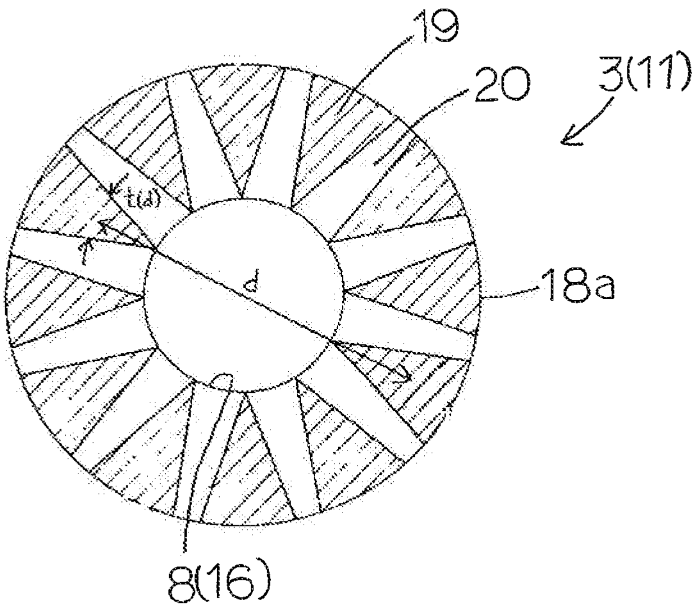
FIG. 23 PRIOR ART
FIG. 23 is a D-D line cross sectional view of FIG. 22.

FIG. 15 is a diagram comparing the particle size distribution of the fine particles when the raw material slurry is classified by the classifying rotors with the shape 3 not having the rectifying blade and with the shape 5 having the rectifying blade, respectively, with the formed angle α at 30 degrees. In FIG. 15, the lateral axis indicates the particle size (μm), and the vertical axis indicates a volume-based frequency (%). From FIG. 15, it is found that the classification accuracy of the shape 5 with the rectifying blade is drastically improved.

In the conventional classifying rotor without the rectifying blade, a flowing state of the fluid flowing in form the outer peripheral portion and exceeding the classifying blade becomes unstable, which influenced the flowing state in the classification chamber and worsened the classification accuracy. However, the flow of the fluid on the inner side from the classifying blade can be made stable by providing the rectifying blade. And thus, the flowing state in the classification chamber is made stable, and the classification accuracy can be drastically improved.

INDUSTRIAL APPLICABILITY

The classifying apparatus of the present invention can be used in industrial fields in general handling classification of any powder bodies in the wet and dry types up to micron to submicron levels. This can be used in the metal industry, chemical industry, pharmaceutical industry, cosmetics industry, pigments, ceramic industry and other industries, for example.

The invention claimed is:

1. A classifying rotor comprising:

a rotatable frame body having an opening portion on an outer peripheral portion and having an ejection port for ejecting a fluid having flowed into an inside through the opening portion to an outside, the rotatable frame body comprising two circular plates disposed coaxially with each other and vertically separated from each other;

a plurality of classifying blades disposed at a desired interval in a circumferential direction on an outer peripheral side part in the frame body and between the two circular plates; and a plurality of rectifying blades disposed on an inner side part from the classifying blade in the frame body at a desired interval in the circumferential direction and between the two circular plates;

wherein the ejection port is located at a center part of the rotatable frame body, and wherein the plurality of rectifying blades are located between the election port and the plurality of classifying blades.

2. The classifying rotor according to claim 1, wherein a shape of the classifying blade is formed so that classification particle size becomes constant on an entire region in a radial direction from an outer periphery to an inner periphery in a classification chamber formed between the adjacent classifying blades.

3. The classifying rotor of claim 1, wherein the classifying rotor is provided in a housing;

wherein the classifying blades are provided so that an angle formed by a direction of the classifying blade and a rotating direction of the frame body becomes a desired inclination angle; and wherein the desired inclination angle is an angle at which classification accuracy becomes better when the classifying blades are inclined so that the formed angle is less than 90 degrees.

4. The classifying apparatus as recited in claim 3, further comprising rotating means for rotating the classifying rotor, and an outflow chamber which causes particles classified by the classifying rotor and having flowed into the classifying rotor to flow out of the housing.

5. The classifying apparatus as recited in claim 3, further comprising rotating means for rotating the classifying rotor, the rotating means having a rotating shaft having a through hole extending in an axial direction therethrough for causing particles classified by the classifying rotor and having flowed into the classifying rotor to flow out of the housing.

* * * * *